US009849840B2

(12) United States Patent
Okitsu (10) Patent No.: US 9,849,840 B2
(45) Date of Patent: Dec. 26, 2017

(54) ATTACHING STRUCTURE FOR VEHICLE-MOUNTED EQUIPMENT

(71) Applicant: Calsonic Kansei Corporation, Saitama (JP)

(72) Inventor: Makoto Okitsu, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 440 days.

(21) Appl. No.: 14/572,306

(22) Filed: Dec. 16, 2014

(65) Prior Publication Data

US 2015/0165982 A1 Jun. 18, 2015

(30) Foreign Application Priority Data

Dec. 17, 2013 (JP) ................................. 2013-260559

(51) Int. Cl.
*B60R 11/00* (2006.01)

(52) U.S. Cl.
CPC ....... *B60R 11/00* (2013.01); *B60R 2011/0059* (2013.01); *B60R 2011/0071* (2013.01); *Y10T 403/60* (2015.01)

(58) Field of Classification Search
CPC .... H01R 13/74; H01R 13/741; H01R 13/743; B60R 2011/0071; B60R 2011/0059;

(Continued)

(56) References Cited

U.S. PATENT DOCUMENTS 4,588,854 A * 5/1986 Bailey ...................... H05K 7/12
174/535
RE34,430 E * 11/1993 Mosquera ............ H01R 13/741
248/27.3

(Continued)

FOREIGN PATENT DOCUMENTS

GB 2305789 4/1997
JP 05-91173 4/1993

*Primary Examiner* — Michael P Ferguson
(74) *Attorney, Agent, or Firm* — Hamre, Schumann, Mueller & Larson, P.C.

(57) ABSTRACT

Rattling of a vehicle-mounted equipment supported by a bracket is restricted. The attaching structure 1 for vehicle-mounted equipment has a housing 20 of vehicle-mounted equipment; an engagement arm 40 provided in the housing 20; a bracket 10 fixed to a vehicle body; and an engagement hole 13 formed in the bracket 10 to be engaged with the engagement arm 40, the engagement arm 40 is formed with a predetermined width along with one side edge 131 of the engagement hole 13 and is capable of being displaced in an engagement direction (the longitudinal direction of the center line Lm) to the engaged portion 135 formed on one side edge 131 of the engagement hole 131, the engagement arm 40 inserted into the engagement hole 13 being elastically engaged with the engaged portion 135 of the engagement hole 13 to attach the housing 20 of vehicle-mounted equipment to the bracket 10, wherein engagement members 50 and 50 are provided independently of the engagement arm 40 on both sides of the engagement arm 40 in the width direction thereof to be capable of being displaced in the width direction (the radial direction of the center line Lm), elastically engaging the engagement members 50 and 50 with the other side edges 133 and 134 of the engagement hole 13.

8 Claims, 5 Drawing Sheets (58) Field of Classification Search
CPC ....... B60R 2011/005; B60R 2011/0042; B60R 2011/0064
See application file for complete search history.

(56) References Cited

U.S. PATENT DOCUMENTS

| | | | | | |
|---|---|---|---|---|---|
| 5,820,394 | A  * | 10/1998 | Kameyama | .......... | H01R 13/743 439/248 |
| 7,371,110 | B2 * | 5/2008 | Murakami | ........... | H01R 13/743 439/248 |
| 7,433,204 | B2 * | 10/2008 | Araishi | .............. | H01R 13/6271 361/740 |
| 7,798,819 | B2 * | 9/2010 | Kudo | ..................... | H01R 13/26 439/567 |
| 7,942,474 | B2 * | 5/2011 | Jones | ................. | B60R 11/0264 180/90 |
| 8,172,605 | B2 * | 5/2012 | Lee | ...................... | H01R 13/743 439/557 |
| 9,366,281 | B2 * | 6/2016 | Garay | ................ | B60R 16/0238 |

\* cited by examiner

ATTACHING STRUCTURE FOR VEHICLE-MOUNTED EQUIPMENT

TECHNICAL FIELD

This invention relates to an attaching structure for vehicle-mounted equipment.

BACKGROUND ART

Japanese Patent Laid-Open No. 05-91173 discloses a known attaching structure in which an engagement hook and an engagement lever of a bracket fixed to a vehicle body are engaged with a housing of vehicle-mounted equipment to install the vehicle-mounted equipment to the bracket.

In the attaching structure, when the housing of the vehicle-mounted equipment is attached to the bracket, the engagement hook of the bracket is engaged with one side of the housing in a longitudinal direction, and then the housing is pivoted about an engaged section between the one side and the engagement hook to engage the engage lever of the bracket with another side of the housing.

However, in the attaching structure, the engagement hook and the engagement lever are engaged with the one side and the other side of the housing of the vehicle-mounted equipment in the longitudinal direction to install the vehicle-mounted equipment to the bracket. Because of this, it is difficult to completely restrict rattling of the housing in a width direction.

Therefore, it is required to restrict the rattling of the vehicle-mounted equipment attached to the bracket when the vehicle-mounted equipment is attached to the bracket fixed to the vehicle body.

SUMMARY OF THE INVENTION

The present invention relates to an attaching structure for vehicle-mounted equipment, the attaching structure comprises:

a housing of vehicle-mounted equipment;
an engagement arm provided in the housing;
a bracket fixed to a vehicle body; and
an engagement hole formed in the bracket to be engaged with the engagement arm, the engagement arm is formed with a predetermined width along one side edge of the engagement hole and is capable of being displaced in an engagement direction to one side edge of the engagement hole, the engagement arm inserted into the engagement hole being elastically engaged with the side edge of the engagement hole to attach the vehicle-mounted equipment to the bracket, wherein engagement members are provided independently of the engagement arm on both sides of the engagement arm in the width direction of the engagement arm to be capable of being displaced in the width direction of the engagement arm, elastically engaging the engagement members with the other side edges of the engagement hole in the width direction.

According to this invention, the engagement members provided in the housing elastically engage with the other side edges located in both sides of the engagement arm in the width direction thereof from among side edges of the engagement hole of the bracket. Thereby the movement of the housing in the width direction is limited by the engagement members.

The movement of the housing in the engagement direction of the engagement arm is limited by the engagement arm elastically engaged with side edge of the engagement hole, and the movement of the housing into two directions with respect to the width direction of the engagement arm, i.e. engagement direction and a width directions of the engagement arm, are limited by the engagement arm and the engagement members. Because of this, it is possible to restrict the rattling of the vehicle-mounted equipment installed to the bracket.

DESCRIPTION OF THE EMBODIMENTS

An explanation will be made of an attaching structure 1 for vehicle-mounted equipment for attaching a housing 20 of the vehicle-mounted equipment to a bracket 10 fixed to a vehicle body according to an embodiment of the present invention.

Figure 1:
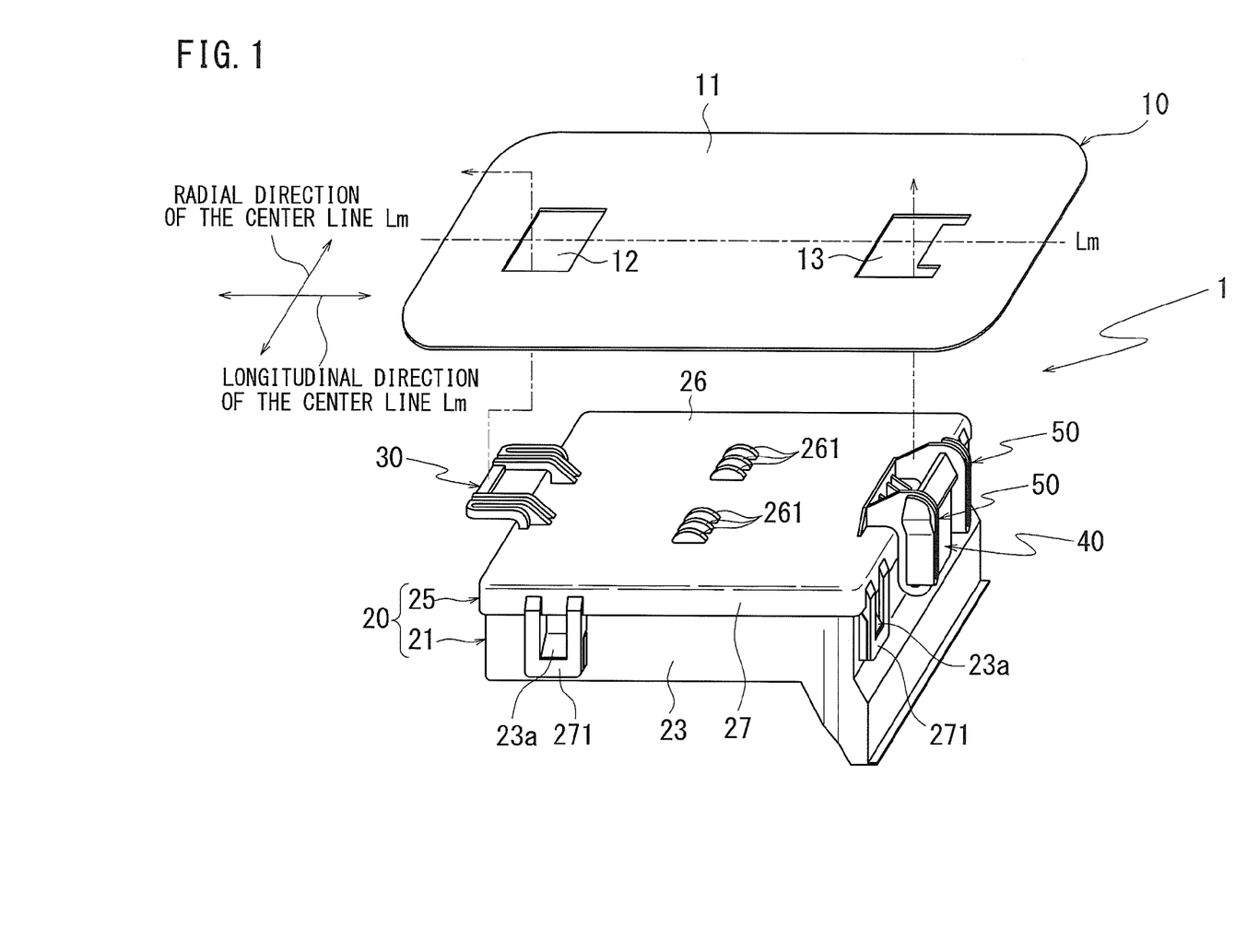
FIG. 1 is a diagram illustrating an installing structure for vehicle-mounted equipment according to an embodiment of the present invention.

FIG. 1 is a diagram illustrating the attaching structure 1 according to the embodiment, which is a perspective view of the bracket 10 and the housing 20 to be mounted to the bracket 10.

Figure 2A:
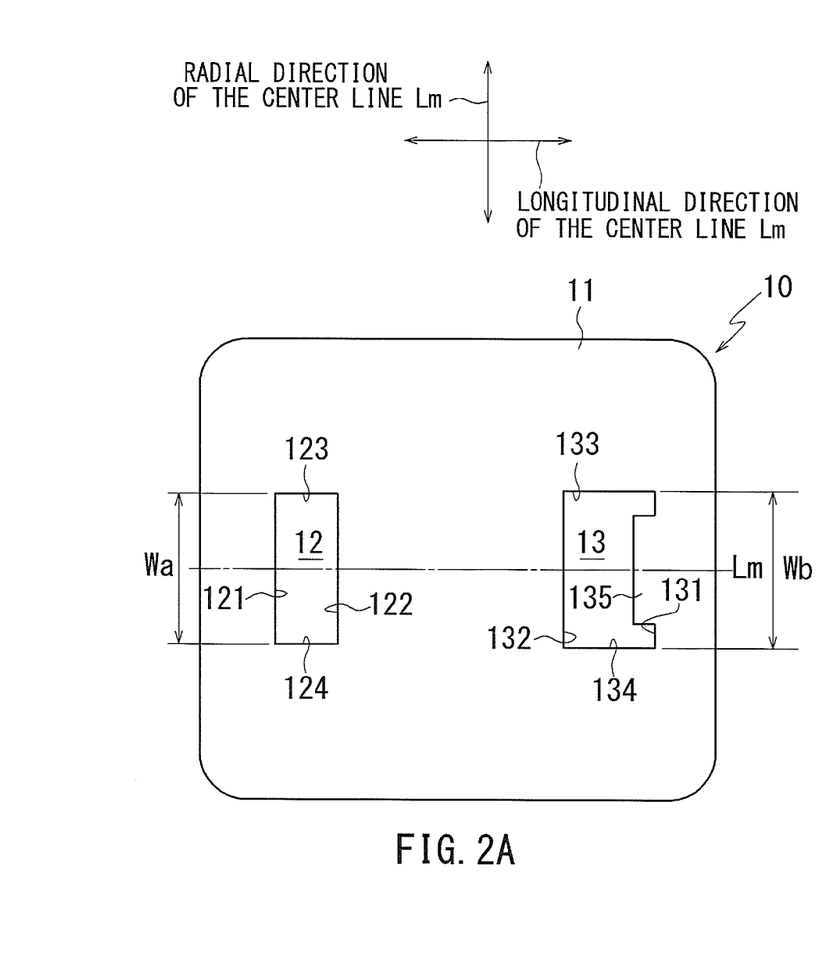
FIGS. 2A and 2B are diagrams illustrating the installing structure according to the embodiment.
Figure 2B:
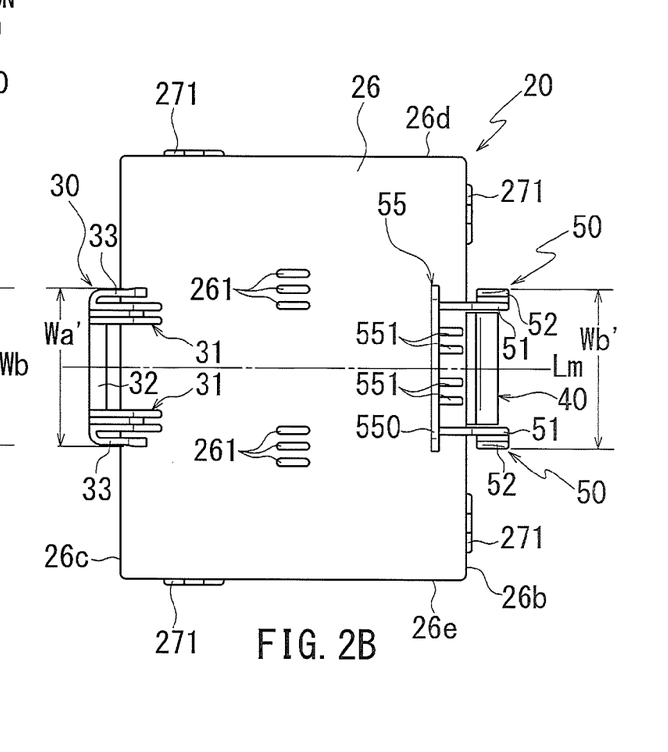

FIG. 2A is a plan view of the bracket 10 and FIG. 2B is a plan view of the housing 20 as viewed from the bracket 10-side.

The positional relationship between structural elements in the bracket 10 and the housing 20 will be hereinafter described with respect to the center line Lm.

The bracket 10 is a plate-shaped member attached to a structural member (not shown) of the vehicle body, and has a rectangular base 11.

The base 11 is perforated with engagement holes 12, 13 extending in the thickness direction of the base 11. The engagement holes 12, 13 are arranged at an interval in the longitudinal direction of the base 11 on a centerline Lm extending through the width direction center of the base 11.

The engagement holes 12, 13 respectively have predetermined widths Wa, Wb, and the centerline Lm passes through the width direction center of each of the engagement holes 12, 13.

The engagement hole 12 has side edges 123, 124 located in parallel to each other at positions symmetric with respect to the centerline Lm, and mutually parallel side edges 121, 122 each connected between ends of the side edges 123, 124, so that the engagement hole 12 is formed in a rectangular shape in a plan view.

The engagement hole 13 has side edges 133, 134 located in parallel to each other at positions symmetric with respect to the center line Lm, and mutually parallel side edges 131, 132 each connected between ends of the side edges 133, 134. A rectangular-shaped engaged portion 135 protrudes into the engagement hole 13 from the side edge 131.

In the embodiment, for attachment of the housing 20 to the bracket 10, an engagement arm 40 and engagement members 50 provided on the housing 20 are engaged into one engagement hole 13 of the engagement holes 12, 13 arranged in the longitudinal direction of the bracket 10, and a lock member 30 provided in the housing 20 is secured to the other engagement hole 12.

As illustrated in FIG. 1, the housing 20 has an upper casing 21 capable of accommodating the vehicle-mounted equipment and a lower casing 25 closing up an opening of the upper casing 21 from the bracket 10-side. The lower casing 25 has a wall 26 closing up the opening of the upper casing 21 and a peripheral wall 27 surrounding all four sides of the wall 26.

The peripheral wall 27 of the lower casing 25 is formed in a size that allows the peripheral wall 27 to be fitted over a peripheral wall 23 of the upper casing 21. The lower casing 25 is assembled to the upper casing 21 by engaging engagement tabs 271 extending from the peripheral wall 27 with engagement projections 23a provided on the peripheral wall 23 of the upper casing 21.

As shown in FIG. 2, the wall 26 of the lower casing 25 is formed in a rectangular shape in a plan view. The engagement arm 40 and the engagement members 50 are placed on one side 26b among mutually parallel sides 26b and 26c of the wall 26. The lock member 30 is placed on the other side 26c of the wall 26.

The engagement arm 40 is located at about the center in the longitudinal direction (in up and down direction in FIG. 2B) of the side 26b. The center line Lm is located parallel to the other sides 26d and 26e of the wall 26 in plan viewing. Here, the center line Lm connects the center point in the longitudinal direction of the side 26b of the engagement arm 40 with the center point in the longitudinal direction of the side 26c of the lock member 30.

Bulging protrusions 261 are formed on an approximately central portion of the wall 26 in the longitudinal direction of the center line Lm to bulge toward the bracket 10.

The bulging protrusions 261 are arranged in parallel to the centerline Lm, of which three bulging protrusions 261 are located on each of one side and the other side with respect to the center line Lm.

Each of the bulging protrusions 261 has an arc-shaped outline of which a central portion in the longitudinal direction of the center line Lm is located closest to the bracket 10 (see FIG. 1).

Figure 3A:
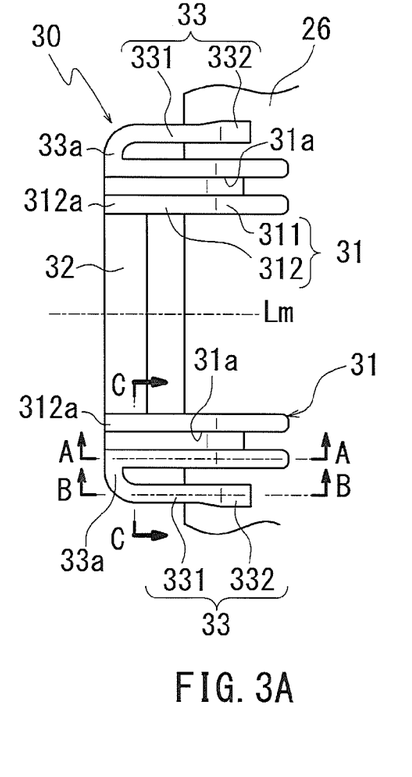
FIGS. 3A, 3B, 3C and 3D are diagrams illustrating an essential part of the installing structure according to the embodiment.
Figures 3B, 3C, 3D:
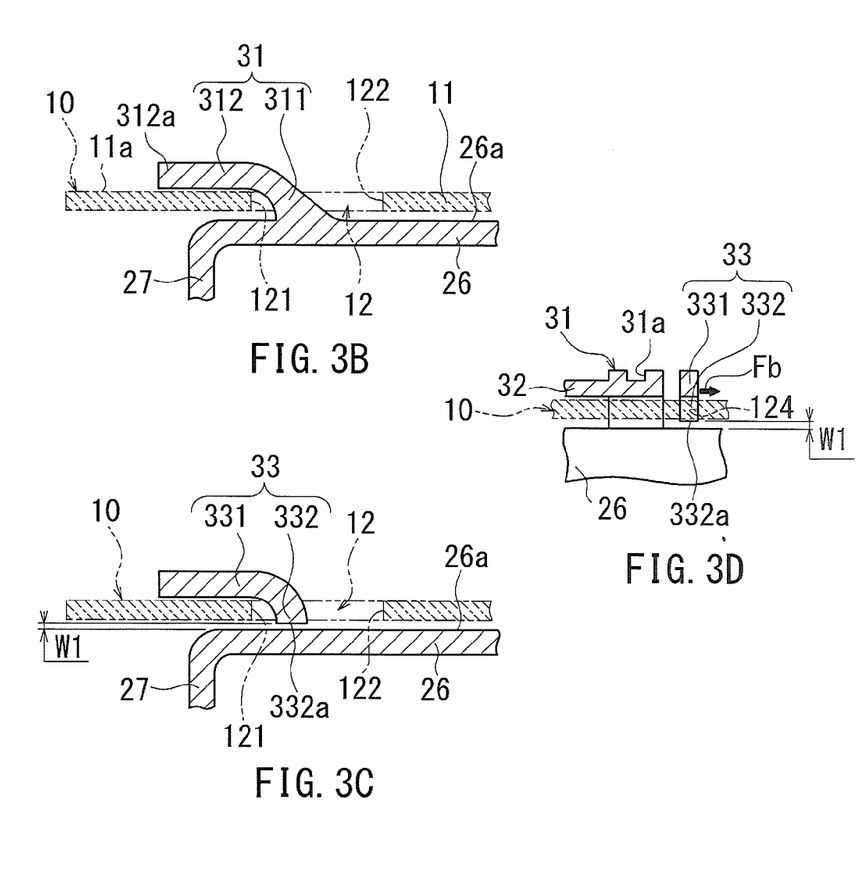

FIGS. 3A to 3D illustrate the lock member 30 placed on the side 26c of the housing 20 in the longitudinal direction of the center line Lm. FIG. 3A is an enlarged view of an area around the lock member 30. FIG. 3B is a sectional view taken along the A-A line in FIG. 3A. FIG. 3C is a sectional view taken along the B-B line in FIG. 3A. FIG. 3D is a sectional view taken along the C-C line in FIG. 3A.

Figure 4A:
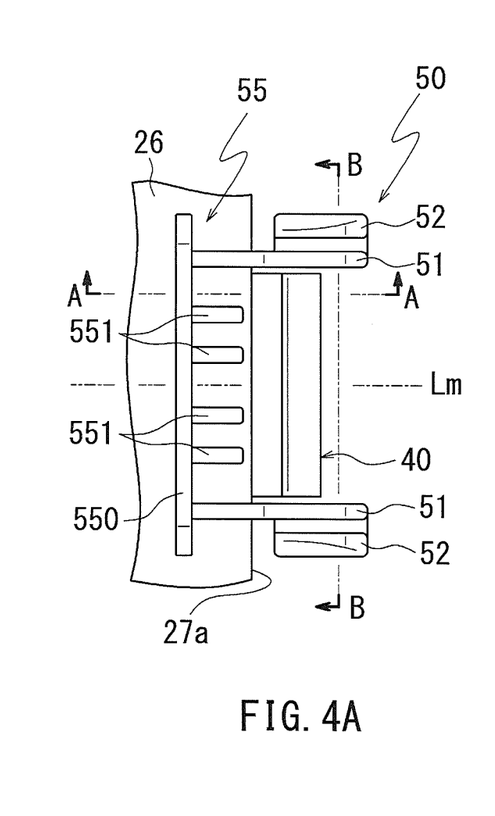
FIGS. 4A, 4B and 4C are diagrams illustrating another essential part of the installing structure according to the embodiment.
Figure 4B:
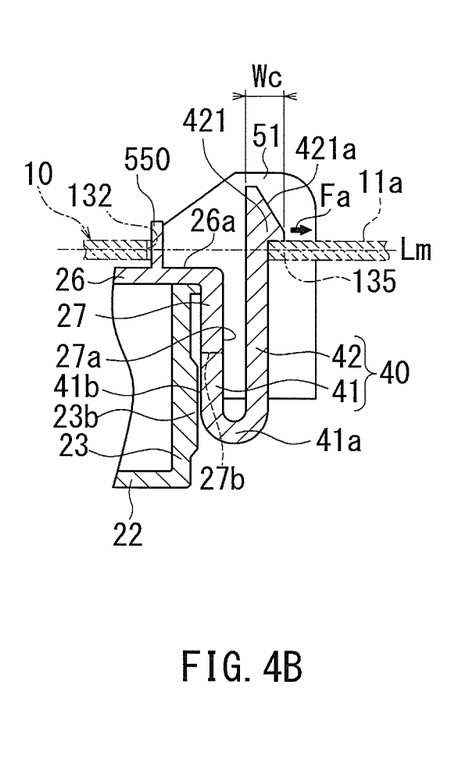
Figure 4C:
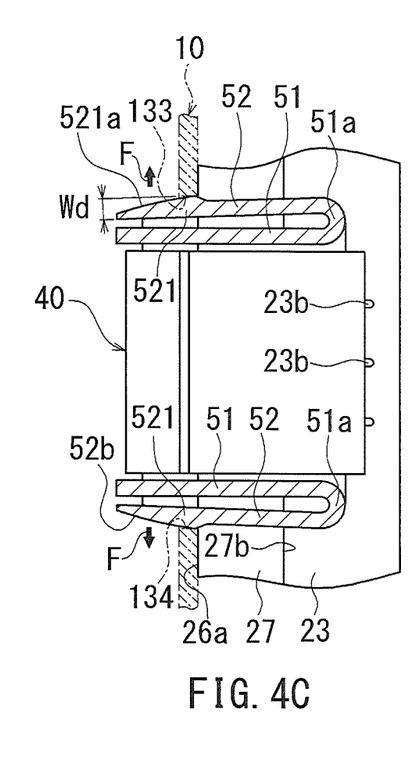

FIGS. 4A, 4B and 4C illustrate the engagement members 50 and the engagement arm 40 placed on the side 26b in the longitudinal direction of the center line Lm of the housing 20. FIG. 4A is an enlarged view of an area around the engagement member 50 and the engagement arm 40. FIG. 4B is a sectional view taken along the A-A line in FIG. 4A. FIG. 4C is a sectional view taken along the B-B line in FIG. 4A.

The bracket 10 with the housing 20 mounted to the bracket 10 is shown in FIGS. 3B, 3C and 3D, and FIGS. 4B and 4C by a phantom line.

<Lock Member 30>

As illustrated in FIGS. 3A to 3D, the lock member 30 has a pair of engagement arm portions 31 located symmetrically with respect to the centerline Lm. Each of the engagement arm portions 31 has a base 311 extending from the wall 26 upward to the bracket 10-side, and an extending portion 312 extending outward of the wall 26 from the leading end of the base 311. A groove 31a is formed in the upper surface of each engagement arm portion 31 to extend in an area from the base 311 to the extending portion 312 along the extending direction of the engagement arm portion 31.

Each of the extending portions 312 is placed apart from the upper surface 26a of the wall 26 to be in parallel to the wall 26. The extending portion 312 extends linearly and in parallel to the center line Lm.

The extending portions 312 respectively have leading ends 312a located outward of the peripheral wall 27 extending along the outer periphery of the wall 26. The leading ends 312a are connected to each other by a plate-shaped connection element 32 which is perpendicular to the center line Lm.

Each of the leading ends 312a of the extending portions 312 is connected to a proximal end 33a of a displacement element 33 on the side opposite to the connection element 32. The displacement element 33 has an extending portion 331 located outward of the extending portion 312 of the engagement arm portion 31 to extend toward the wall 26 along the center line Lm, and a bend 332 formed by bending the leading end of the extending portion 331 downward toward the wall 26.

Each of the displacement elements 33 is formed in a length required for the corresponding bend 332 at its leading end to be located above the wall 26, so that a leading-end face 332a of the bend 332 faces the upper surface 26a of the wall 26 with a space W1 being created between the leading-end face 332a and the upper surface 26a.

The displacement elements 33 are cantilevered respectively by the extending portions 312 of the engagement arm portions 31. The bends 332 of the displacement elements 33 are capable of being displaced in the radial direction from the center line Lm.

A separation distance Wa' between the bends 332 in the radial direction (see FIG. 2B) is slightly larger than the width Wa of the engagement hole 12 of the bracket 10. When the lock member 30 is locked into the engagement hole 12 of the bracket 10, the bends 332 of the displacement elements 33 are pressed respectively against the side edges 123, 124 of the engagement hole 12 while being slightly displaced toward the center line Lm (see the arrow Fb in FIG. 3D).

<Engagement Arm 40>

The engagement arm 40 placed on the side 26b in the longitudinal direction of the center line Lm has a base 41 extending downward from the peripheral wall 27 of the wall 26 (in the direction away from the bracket 10), and an engagement portion 42 extending from the lower end of the base 41 in the direction of approaching the bracket 10.

The engagement portion 42 is placed outward of the base 41 in the longitudinal direction of the center line Lm of the wall (housing 20), and is connected to the base 41 through an arc-shaped section bend 41a which is provided at the lower end of the base 41. Thus, the engagement arm 40 is formed in a U shape in a sectional view.

In this state, the engagement portion 42 is cantilevered by the bend 41a provided at the lower end of the base 41. An abutting portion 421 at the leading end of the engagement portion 42 is capable of being displaced in the longitudinal direction of the center line Lm (in the left-right directions in FIG. 4B).

A bulging protrusion 23b protruding toward the base 41 is provided in a position facing an inner face 41b of the base 41 on the peripheral wall 23 of the upper casing 21. The bulging protrusion 23b is intended for the prevention of the inner face 41b of the base 41 from being excessively pressed against the peripheral wall 23 of the upper casing 21 to be bent.

The abutting portion 421 at the leading end of the engagement portion 42 has a thickness We in the longitudinal direction of the center line Lm (the left-right directions in FIG. 4B) that is larger than the thickness of the engagement portion 42 close to the bend 41a. Therefore, when the leading end of the engagement portion 42 is inserted through the engagement hole 13 of the bracket 10, the leading end is pressed against the engaged portion 135 formed in the engagement hole 13 from the wall 26 (see arrow Fa in FIG. 4B).

In this state, the abutting portion 421 is locked to a face 11a of the bracket 10 on the side opposite to the housing 20, so that the engagement arm 40 is inhibited from falling out of the bracket 10.

A slope 421a is formed on the outer face of the abutting portion 421 to have the thickness We of the abutting portion 421 in the longitudinal direction of the center line Lm (the left-right directions in FIG. 4B) to taper down toward the leading end, so that the insertion of the abutting portion 421 into the engagement hole 13 of the bracket 10 is guided by the slope 421a.

<Engagement Member 50>

As illustrated in FIG. 2B and FIGS. 4A to 4C, the engagement arm 40 has a predetermined width in the radial direction of the center line Lm, and the engagement members 50 are located on both sides of the engagement arm 40 with respect to the width direction of the engagement arm 40. The engagement members 50 are placed symmetrically with respect to the center line Lm, and are secured to the lower casing 25 through a common attachment 55.

The attachment 55 has a supporting wall 550 extending linearly from the upper surface 26a of the lower casing 25 in an upward direction away from the lower casing 25.

In a plan view, the supporting wall 550 extends linearly beyond the center line Lm of the wall 26 in the width direction of the wall 26 so as to intersect the center line Lm at right angles.

The supporting wall 550 is placed in parallel to the peripheral wall 27 of the wall 26 facing the engagement arm 40 (see FIG. 4B). A plurality of ribs 551 are provided on the face of the supporting wall 550 facing toward the engagement arm 40 in order to reinforce the strength of the supporting wall 550.

The plurality of ribs 551 are arranged at predetermined intervals in the radial direction of the center line Lm. Each of the engagement members 50 has a base 51 connected to a portion of the supporting wall 550 located outward of the ribs 551 in the radial direction of the center line Lm.

As illustrated in FIGS. 4B and 4C, the base 51 is formed to extend downward of the lower end face 27b of the peripheral wall 27 beyond the range from the upper surface 26a of the wall 26 to the outer peripheral face 27a of the peripheral wall 27.

An elastic engagement portion 52 is placed outward of the base 51 in the radial direction of the center line Lm to extend in a direction of approaching the bracket 10. The elastic engagement portion 52 is connected to the base 51 through an arc-shaped section bend 51a provided at the lower end of the base 51. Thus, the elastic engagement portion 52 is formed in a U shape in a sectional view.

In this state, the elastic engagement portion 52 is cantilevered by the bend 51a provided at the lower end of the base 51, and a leading end at which an engagement portion 521 is provided is capable of being displaced in the radial direction of the center line Lm (the up-down directions in FIG. 4C).

The engagement portion 521 at the leading end of the elastic engagement portion 52 has a thickness Wd in the radial direction of the center line Lm that is larger than the thickness of end of the elastic engagement portion 52 closer to the bend 51a. A separation distance Wb' between the elastic engagement portions 52 in the radial direction of the center line Lm (see FIG. 2B) is slightly larger than the width Wb of the engagement hole 13 of the bracket 10.

Therefore, when the engagement members 50 are engaged into the engagement hole 13 of the bracket 10, the engagement portions 521 of the elastic engagement portions 52 are slightly displaced toward the center (the center line Lm) in the radial direction of the center line Lm (see arrows F in FIG. 4C), and in this state the engagement portions 521 are pressed against the side edges 133, 134 of the engagement hole 13.

In this connection, a slope 521a is formed on the outer face of each of the engagement portions 521 to have the thickness Wd of the engagement portion 521 in the radial direction of the center line Lm (the up-down directions in FIG. 4C) to taper down toward the leading end. Thus, when the engagement members 50 are inserted into the engagement hole 13 of bracket 10, the insertion of the engagement portions 521 into the engagement hole 13 is guided by the slopes 521a.

Hereinafter, an explanation will be made of mounting of the housing 20 of the vehicle-mounted equipment to the bracket 10.

Figure 5A:
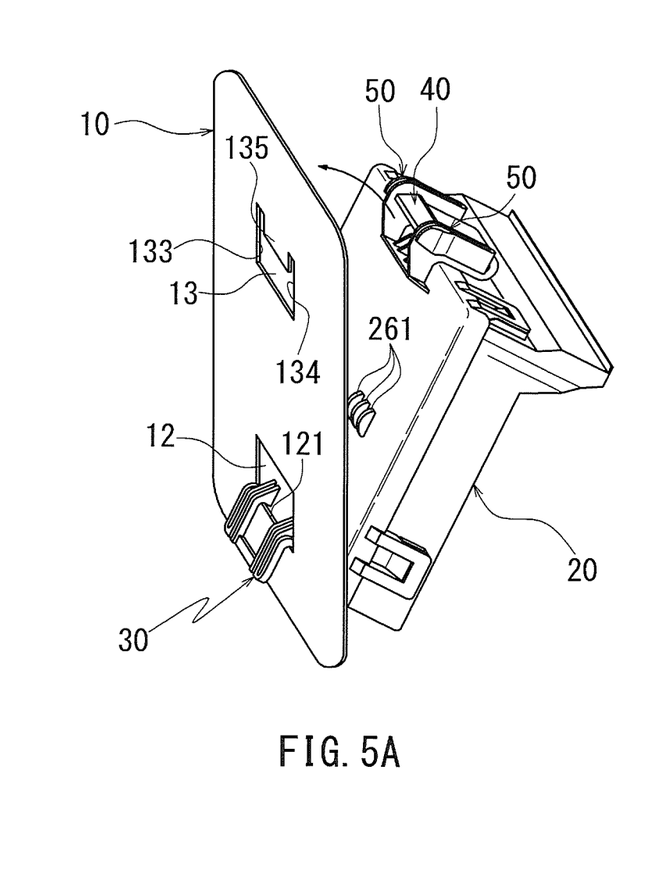
FIGS. 5A and 5B are diagrams illustrating the function of the installing structure according to the embodiment.
Figure 5B:
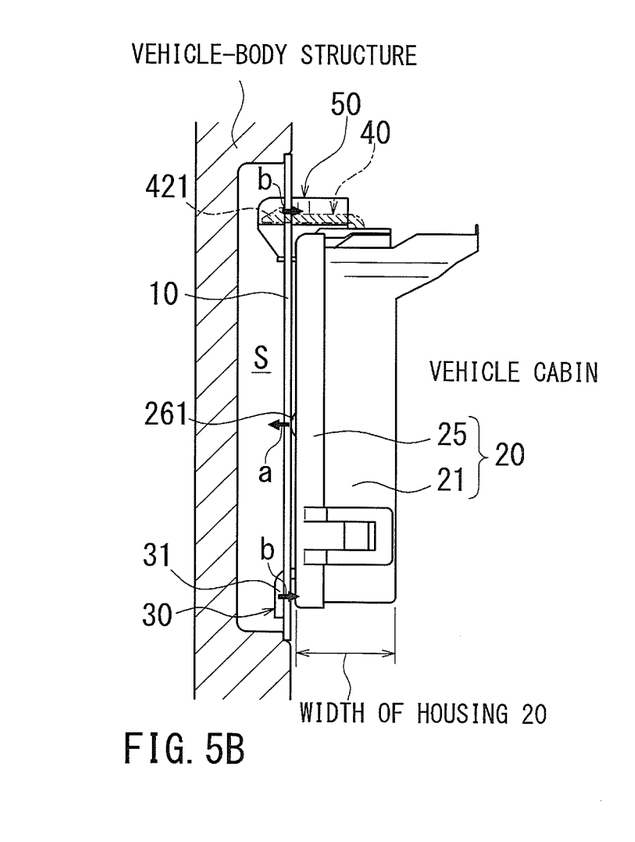

FIGS. 5A and 5B are views illustrating mounting of the housing 20 of the vehicle-mounted equipment to the bracket 10. FIG. 5A is a view illustrating the lock member 30 provided on the housing 20 being locked into the engagement hole 12 of the bracket 10, while FIG. 5B is a view showing the engagement arm 40 and the engagement member 50 provided in the housing 20 being engaged with the engagement hole 13 of the bracket 10, which shows an example of the bracket 10 mounted in a vehicle cabin.

Initially, the lock member 30 provided on the other side 26c of the housing 20 of the vehicle-mounted equipment is locked to the side edge 121 of the engagement hole 12 of the bracket 10, and then the housing 20 is pivoted about the engaged section of the lock member 30 and the engagement hole 12 such that the side 26b of the housing 20 (on which the engagement arm 40 is provided) is turned in the direction in which the side 26b of the housing 20 (on which the engagement arm 40 is provided) is moved closer to the engagement hole 13 of the bracket 10 (see the arrow in FIG. 5A).

As a result, the engagement arm 40 provided on the side 26b of the housing 20 is snapped onto the engaged portion 135 protruding into the engagement hole 13, completing the positioning of the housing 20 in the longitudinal direction of the center line Lm.

Concurrently with the snap engagement of the engagement arm 40, the engagement members 50 located on both sides of the engagement arm 40 are pressed against the side edges 133, 134 of the engagement hole 13, thus completing the positioning of the housing 20 in the radial direction of the center line Lm.

As a result, in the engaged section of the housing 20 engaged with the engagement hole 13 of the bracket 10, the movement of the housing 20 in the longitudinal direction of the center line Lm is limited by the engagement arm 40, and also the movement of the housing 20 in the radial direction of the center line Lm is limited by the engagement members 50.

Further, in the lock member 30 provided on the other side 26c of the housing 20, the displacement elements 33 (the bends 332) provided in the lock member 30 limits the movement of the housing 20 in the radial direction of the center line Lm, and also the engagement arm portions 31 engaged with the side edge 121 of the engagement hole 12 limits the movement of the housing 20 in the longitudinal direction of the center line Lm.

Thus, in a state where the rattling of the housing 20 of the vehicle-mounted equipment is restricted, the housing 20 of the vehicle-mounted equipment is attached to the bracket 10.

In the housing 20 attached to the bracket 10, the bulging protrusions 261 provided on the housing 20 are pressed against the surface of the bracket 10 facing toward the housing 20. In this state, a biasing force biasing the bracket 10 in a direction of being away from the housing 20 of the vehicle-mounted equipment (see arrow a in FIG. 5B) acts on the bracket 10.

At this stage, the engagement arm portions 31 of the lock member 30 and the abutting portion 421 of the engagement arm 40 are locked on the face of bracket 10 opposite to the housing 20.

For this reason, the biasing force biasing the bracket 10 in a direction of being away from the housing 20 of the vehicle-mounted equipment (see arrow a in FIG. 5B) acts in a direction of pressing the engagement arm portions 31 of the lock member 30 and the abutting portion 421 of the engagement arm 40 against the bracket 10 (see arrows b in FIG. 5B). This makes it possible to attach the housing 20 to the bracket 10 with reliable prevention of the rattling of the housing 20.

As described above, according to the embodiment:
(1) an attaching structure 1 for vehicle-mounted equipment, the attaching structure 1 comprises a housing 20 of vehicle-mounted equipment; an engagement arm 40 provided in the housing 20; a bracket 10 fixed to a vehicle body; and an engagement hole 13 formed in the bracket 10 to be engaged with the engagement arm 40, the engagement arm 40 is formed with a predetermined width along with one side edge 131 of the engagement hole 13 and is capable of being displaced in an engagement direction (the longitudinal direction of the center line Lm) to the engaged portion 135 formed on one side edge 131 of the engagement hole 131, the engagement arm 40 inserted into the engagement hole 13 being elastically engaged with the engaged portion 135 of the engagement hole 13 to attach the housing 20 of vehicle-mounted equipment to the bracket 10, wherein engagement members 50 and 50 are provided independently of the engagement arm 40 on both sides of the engagement arm 40 in the width direction (the redial direction of the center line Lm) of the engagement arm 40 to be capable of being displaced in the width direction (the radial direction of the center line Lm) of the engagement arm 40, elastically engaging the engagement members 50 and 50 with the other side edges 133 and 134 of the engagement hole 13.

With such a construction, the engagement members 50 provided on the housing 20 are elastically engaged with the side edges 133 and 134 of the engagement hole 13 in the width direction of the engagement arm 40, so that the movement of the housing 20 in the width direction (the radial direction of the center line Lm) is limited.

In this connection, the movement of the housing 20 in the engagement direction (the longitudinal direction of the center line Lm) is limited by the engagement arm 40 elastically engaged with the engaged portion 135 of the engagement hole 13, and also the movements of the housing 20 into two directions, i.e. engagement direction and a width directions of the engagement arm 40, are limited by the engagement arm 40 and the engagement members 50. This makes it possible to restrict the rattling of the vehicle-mounted equipment installed to the bracket 10.

(2) The engagement members 50 are provided on the side 26b of the wall 26 of the housing 20 in the engagement direction (the longitudinal direction of the center line Lm).

Each of the engagement members 50 has the base 51 extending in the direction of being away from the bracket 10 along the outer periphery of the housing 20, and the elastic engagement portion 52 located outward of the base 51 in the radial direction of the center line Lm to extend in the direction of approaching the bracket 10 from the leading end of the base 51.

The elastic engagement portion 52 is cantilevered by the bend 51a provided at the lower end of the base 51, and the engagement portion 521 closer to the bracket 10 is capable of being displaced in the radial direction of the center line Lm.

With such a construction, the supporting points (the bends 51a) of the elastic engagement portions 52 in the engagement members 50 are located at a distance from the bracket 10. Because of this, the amount of displacement of the engagement portions 521 of the elastic engagement portions 52 in the bracket 10 can be ensured.

Further, the basic shape of each of the elastic engagement portions 52 is designed as a U shape detouring within the range in the thickness direction of the housing 20 to ensure the amount of displacement of the elastic engagement portion 52 without a great protrusion of the elastic engagement portion 52 from the housing 20 toward the bracket 10. This eliminates the necessity to provide a large space S on the opposite side of the bracket 10 from the housing 20 for avoiding interference with the elastic engagement portions 52 passing through the engagement hole 13.

Accordingly, when the housing 20 of the vehicle-mounted equipment attached to the bracket 10 is installed in the vehicle cabin, the thickness of the vehicle-body structure is not required to be increased to provide the space S. As a result, it is possible to suitably prevent the space in the vehicle cabin from being narrowed by increasing the thickness of the vehicle-body structure.

Further, since a large amount of displacement of the elastic engagement portions 52 can be provided, a feeling of moderation in the engagement of the elastic engagement portions 52 into the engagement hole 13 can be properly produced.

As a result, in the process of attaching the housing 20 to the bracket 10, a worker involved in the attaching process can be aware of whether or not the attaching process is properly completed by the presence or absence of the feeling of moderation when the elastic engagement portions 52 are engaged with the engagement hole 13. This makes it possible to prevent a failure of attachment of the housing 20 to the bracket 10.

(3) The lock member 30, which passes through the other engagement hole 12 provided in the bracket 10 to be locked to the bracket 10, is provided on the side 26c of the housing 20 (the wall 26) in the engagement direction (the longitudinal direction of the center line Lm).

The lock member 30 is provided with the displacement element 33 capable of being displaced in the radial direction of the center line Lm and the displacement element 33 is elastically engaged with the side edges 123, 124 of the other engagement hole 12.

With such a construction, the restriction in rattling caused in the radial direction of the center line Lm on the side 26c of the housing 20 (close to the lock member 30) is made possible, making it possible to further restrict the rattling of the vehicle-mounted equipment attached to the bracket 10.

(4) The vehicle-mounted equipment is installed to the bracket 10 by locking the lock member 30 into the engagement hole 12, then turning the side 26b of the housing 20 about the locked section of the lock member 30 and the engagement hole 12 to elastically engage the engagement arm 40 and the engagement members 50 on the edges 26b with the engaged portion 135 provided in the side edge 131 and the side edges 133, 134 of the engagement hole 13.

In the engagement portion 521 of the elastic engagement portion 52 of each of the engagement members 50, the slope 521a is formed on the outer face of the wall 26 in the radial direction of the center line Lm to have the thickness Wd of the engagement portion 521 in the radial direction of the center line Lm to taper down toward the leading end.

With such a construction, since the engagement portions 521 at the leading ends of the elastic engagement portions 52 of the engagement members 50 are inserted into the engagement hole 13 from the direction perpendicular to the opening of the engagement hole 13, the slopes 521a provided at the leading ends of the engagement portions 521 facilitate the insertion of the elastic engagement portions 52 into the engagement hole 13.

(5) The engagement arm portions 31 of the lock member 30 are locked to the face 11a of the bracket 10 opposite from the housing 20, and the abutting portion 421 at the leading end of the engagement arm 40 is locked to the face 11a of the bracket 10 opposite from the housing 20.

The housing 20 is formed by assembling the upper casing 21 capable of accommodating the vehicle-mounted equipment and the lower casing 25 closing up the opening of the upper casing 21 from the bracket 10-side to each other.

The wall 26 of the lower case 25 is provided with the bulging protrusions 261 on the portion facing the bracket 10 to protrude toward the bracket 10.

The bulging protrusions 261 each have a height sufficient to come into contact with the bracket 10 when the housing 20 of the vehicle-mounted equipment is attached to the bracket 10.

With such a construction, the force for moving the housing 20 in the direction of separating the housing 20 from the bracket 10 acts on the housing 20 from the bulging protrusions 261 in contact with the bracket 10. At this point, the engagement arm portions 31 of the lock member 30 and the abutting portion 421 of the engagement arm 40 are locked to the face 11a of the bracket 10 opposite from the housing 20. When the force in the direction of separating the housing 20 from the bracket 10 acts on the housing 20, since the direction of the force is a direction in which the engagement arm portions 31 of the lock member 30 and the abutting portion 421 of the engagement arm 40 are locked to the face 11a of the bracket 10 opposite from the housing 20, the rattling of the housing 20 attached to the bracket 10 can be further restricted.

In particular, since the housing 20 is formed by assembling the upper casing 21 and the lower casing 25 to each other, the upper casing 21 and the lower casing 25 can be formed respectively of resin materials with different stiffness and strength.

For example, when the lower casing 25 is formed of a material with a higher stiffness and strength than that of the upper casing 21, even if the bulging amount of the lower casing 25 toward the bracket 10 is increased, a reaction force acting on the bulging protrusions 261 from the bracket 10 suitably prevents deformation of the wall 26 of the lower casing 25.

Accordingly, the engagement arm portions 31 of the lock member 30 provided on the lower casing 25 and the abutting portion 421 of the engagement arm 40 are able to be locked to the bracket 10 with a larger force. Because of this, a reliable restriction in rattling of the housing 20 attached to the bracket 10 is expected.

(6) The engagement arm 40 has the base 41 extending in the direction of being away from the bracket 10 along the outer periphery of the side 26b of the housing 20, and the engagement portion 42 extending from the bend 41a at the leading end of the base 41 in the direction of approaching the bracket 10 on the outer side of the base 41 in the engagement direction (the longitudinal direction of the center line Lm).

The engagement portion 42 is cantilevered by the bend 41a at the leading end of the base 41, and the engagement portion 42 to the bracket 10 is capable of being displaced in the engagement direction (the longitudinal direction of the center line Lm).

With such a construction, the supporting point (the bend 41a) of the engagement portion 42 in the engagement arm 40 is located at a distance from the bracket 10. Because of this, the amount of displacement of the engagement portion 42 in the bracket 10 can be ensured.

In particular, the basic shape of the engagement arm 40 is designed as a U shape detouring within the range in the thickness direction of the housing 20 to ensure the amount of displacement of the engagement arm 40 without a great protrusion of the engagement arm 40 from the housing 20 toward the bracket 10. This eliminates the necessity to provide a large space S on the opposite side of the bracket 10 from the housing 20 for avoiding interference with the engagement arm 40 passing through the engagement hole 13.

Accordingly, when the housing 20 of the vehicle-mounted equipment attached to the bracket 10 is installed in the vehicle cabin, the thickness of the vehicle-body structure is not required to be increased to provide the space S. As a result, it is possible to suitably prevent the space in the vehicle cabin from being narrowed by increasing the thickness of the vehicle-body structure.

Further, since a large amount of displacement of the elastic engagement portions 52 can be provided, the feeling of moderation in the engagement of the elastic engagement portions 52 into the engagement hole 13 can be properly produced.

As a result, in the process of attaching the housing 20 to the bracket 10, a worker involved in the attaching process can be aware of whether or not the attaching process is properly completed by the presence or absence of the feeling of moderation when the elastic engagement portions 52 are engaged with the engagement hole 13. This makes it possible to prevent a failure of attachment of the housing 20 to the bracket 10.

In the above described embodiment, engagement members 50 provided on both sides of the engagement arm 40 in the width direction (the radial direction of the center line Lm) thereof, and the engagement members 50 are capable of being displaced in the width direction (the radial direction of the center line Lm) of the engagement arm 40.

The direction in which the engagement member 50 is displaced is not required to be exactly perpendicular to the center line Lm. The displacement direction of the engagement member 50 may be inclined at predetermined angle with respect to the center line Lm, as long as the restriction of the movement in the radial direction of the center line Lm of the housing 20 is possible.

What is claimed is:

1. An attaching structure for vehicle-mounted equipment, comprising:
   a housing of vehicle-mounted equipment;
   an engagement arm provided on the housing;
   engagement members provided on the housing;
   a bracket fixed to a vehicle body; and
   an engagement hole formed in the bracket to be engaged with the engagement arm, wherein:
   the engagement arm is formed with a predetermined width along one side edge of the engagement hole,
   the engagement arm is cantilevered at a base which extends in a direction away from the bracket along an outer periphery of the housing, the engagement arm is capable of being displaced in an engagement direction to the one side edge of the engagement hole, and the engagement arm is capable of being elastically engaged with the one side edge of the engagement hole,
   the engagement members are provided on both sides of the engagement arm in a width direction of the engagement arm,
   each of the engagement members is cantilevered at a base which extends in a direction away from the bracket along the outer periphery of the housing, each of the engagement members capable of being elastically engaged with side edges of the engagement hole other than the one side edge of the engagement hole,
   the side edges of the engagement hole other than the one side edge of the engagement hole are spaced apart in the width direction of the engagement arm, and each of the side edges of the engagement hole other than the one side edge of the engagement hole is connected to one end and another end of the one side edge,
   each base of the engagement members and the base of the engagement arm are provided independently on the housing so as to not influence the elastic engagement of the engagement members and the engagement arms with each other.

2. The attaching structure for vehicle-mounted equipment according to claim 1, wherein:
   the engagement members are provided on a first side of the housing in the engagement direction of the engagement arm, and
   each of the engagement members is capable of being displaced in the width direction of the engagement arm.

3. The attaching structure for vehicle-mounted equipment according to claim 2, wherein:
   a lock member is provided on a second side of the housing in the engagement direction of the engagement arm;
   an another engagement hole is formed in the bracket to be engaged with the lock member,
   the lock member is provided with a displacement element capable of being displaced in the width direction of the housing; and
   the displacement element is elastically engaged with side edges of the other engagement hole in the width direction.

4. The attaching structure for vehicle-mounted equipment according to claim 3, wherein:
   the housing of the vehicle-mounted equipment is attached to the bracket by locking the lock member into the other engagement hole, then turning the housing about a locked section of the lock member and the other engagement hole to elastically engage the engagement arm and the engagement members with the engagement hole; and
   a slope is formed in an engagement portion of each of the engagement members,
   the slope is formed on the outer face opposed to the other side edges of the engagement hole in the width direction, and
   the slope having a thickness of the engagement portion in the width direction to taper down toward a leading end of the engagement portion.

5. The attaching structure for vehicle-mounted equipment according to claim 1, wherein:
   the engagement arm further includes:
   an engagement portion provided between the base and the one side edge of the engagement hole, and
   the engagement portion is cantilevered at a leading end of the base, and is capable of being displaced in the engagement direction at a side closer to the bracket.

6. An attaching structure for vehicle-mounted equipment, comprising:
   a housing of vehicle-mounted equipment,
   an engagement arm provided on the housing,
   a bracket fixed to a vehicle body, and
   an engagement hole formed in the bracket to be engaged with the engagement arm, wherein the engagement arm is formed with a predetermined width along one side edge of the engagement hole and is capable of being displaced in an engagement direction to the one side edge of the engagement hole, the engagement arm inserted into the engagement hole being elastically engaged with the one side edge of the engagement hole to attach the vehicle-mounted equipment to the bracket;
   wherein engagement members are provided independently of the engagement arm on both sides of the engagement arm in a width direction of the engagement arm to be capable of being displaced in the width direction of the engagement arm, elastically engaging the engagement members with side edges of the engagement hole other than the one side edge of the engagement hole of the engagement hole in the width direction of the engagement arm,
   wherein the engagement arm includes a base extending in a direction of being away from the bracket along an outer periphery of the housing, and an engagement portion extending from a leading end of the base in a direction of approaching the bracket on an outer side of the base in the engagement direction of the engagement arm, wherein the engagement portion is cantilevered at one side by the leading end of the base, and is capable of being displaced in the engagement direction at another side closer to the bracket,
   wherein the engagement members are provided on a first side of the housing in the engagement direction of the engagement arm,
   wherein each of the engagement members has a base extending in a direction of being away from the bracket along an outer periphery of the housing, and an engagement portion located outward of the base in the width direction to extend in a direction of approaching the bracket from a leading end of the base,
   wherein the engagement portion of each of the engagement members is cantilevered at one side by the leading end of the base, and is capable of being displaced in the width direction at another side closer to the bracket; and a lock member passing through another engagement hole provided in the bracket to be locked to the bracket, is provided on a second side of the housing in the engagement direction of the engagement arm;

the lock member is provided with a displacement element capable of being displaced in the width direction of the housing; and the displacement element is elastically engaged with side edges of the other engagement hole in the width direction.

7. The attaching structure for vehicle-mounted equipment according to claim 6, wherein:

the housing of the vehicle-mounted equipment is attached to the bracket by locking the lock member into the other engagement hole, then turning the housing about a locked section of the lock member and the other engagement hole to elastically engage the engagement arm and the engagement members with the engagement hole; and a slope is formed in the engagement portion of each of the engagement members on an outer face in the width direction, the slope having a thickness of the engagement portion in the width direction to taper down toward a leading end of the engagement portion.

8. The attaching structure for vehicle-mounted equipment according to claim 6, wherein:

a leading end of the lock member is locked to a face of the bracket opposite from the housing and a leading end of the engagement arm is locked to the face of the bracket opposite from the housing;

the housing is formed by assembling a first casing capable of accommodating the vehicle-mounted equipment and a second casing closing up an opening of the first casing from the bracket side to each other; and the second casing is provided with a bulging protrusion on a portion facing the bracket to protrude toward the bracket, wherein the bulging protrusion has a height sufficient to come into contact with the bracket when the vehicle-mounted equipment is attached to the bracket.

* * * * *